US006883251B2

United States Patent
Terrell et al.

(10) Patent No.: US 6,883,251 B2
(45) Date of Patent: Apr. 26, 2005

(54) LIVESTOCK COOLING SYSTEM

(76) Inventors: Michael E. Terrell, P.O. Box 6808, Phoenix, AZ (US) 85005; Frank Gilbert Marks, P.O. Box 6608, Phoenix, AZ (US) 85005

( * ) Notice: Subject to any disclaimer, the term of this patent is extended or adjusted under 35 U.S.C. 154(b) by 7 days.

(21) Appl. No.: 10/669,960

(22) Filed: Sep. 23, 2003

(65) Prior Publication Data

US 2004/0065268 A1 Apr. 8, 2004

Related U.S. Application Data

(63) Continuation-in-part of application No. 10/435,469, filed on May 9, 2003, now Pat. No. 6,675,739, which is a continuation of application No. 09/967,678, filed on Sep. 28, 2001, now Pat. No. 6,578,828.

(51) Int. Cl.[7] .................................................. F26B 19/00
(52) U.S. Cl. ............................ 34/527; 34/548; 34/563; 34/61; 34/666; 119/448; 416/100; 454/200
(58) Field of Search .......................... 34/524, 527, 548, 34/563, 61, 666; 119/448; 416/100, 110; 454/200, 210

(56) References Cited

U.S. PATENT DOCUMENTS 5,367,739 A * 11/1994 Johnson ..................... 15/316.1
5,370,500 A * 12/1994 Thompson .................. 416/100
5,658,130 A *  8/1997 Goldstein et al. ........... 416/100
5,822,878 A * 10/1998 Jones .......................... 34/585
6,000,095 A * 12/1999 Johnson ..................... 15/316.1
6,675,739 B1 *  1/2004 Terrell et al. ................ 119/448
6,718,650 B1 *  4/2004 Ross ............................. 34/90

* cited by examiner

*Primary Examiner*—Stephen Gravini
(74) *Attorney, Agent, or Firm*—James M. Duncan

(57) ABSTRACT

A livestock cooling system creates an environment for protecting the health and productivity of animals, particularly dairy cows. One or more cooling fans are connected to programmable oscillation means, enabling the herds man to program fan oscillation according to the location of the livestock. Water is injected under high pressure into the air stream of the fans to create a fog. The system is also programmable according to various environmental conditions, including temperature, humidity, and wind velocity. The pressure and volume of the injected water are programmable and may be adjusted by the controller according to the observed environmental conditions. The disclosed system provides a cool and healthy environment for livestock, where the environment is programmed to track the animals according to the time of day, location of the animals and the location of shade.

20 Claims, 6 Drawing Sheets

LIVESTOCK COOLING SYSTEM

CROSS-REFERENCE TO RELATED APPLICATION

This is a continuation-in-part of U.S. application Ser. No. 10/435,469 filed on May 9, 2003, now U.S. Pat. No. 6,675,739 for which the inventors claim domestic priority. Ser. No. 10/435,469 is a continuation application which claims priority to U.S. application Ser. No. 09/967,678 filed on Sep. 28, 2001, which has issued as U.S. Pat. No. 6,578,828.

BACKGROUND OF THE INVENTION

The present invention generally relates to devices and systems for sheltering livestock, including horses, cattle, swine and poultry, and more specifically to a programmable system for efficiently using evaporative cooling devices to create an environment which protects the health and productivity of the animals.

It is known in animal agriculture to cool livestock with evaporative cooling by wetting the animal and then drying the animal through mechanical ventilation or via natural ventilation. Alternatively, lowering the temperature of the environment will also cool animals if the decreased temperature may be maintained. The disclosed system provides cooling to livestock through direct evaporative cooling and also by decreasing the temperature of the livestock environment.

The disclosed system may deliver small water particles or fog to a desired area without wetting the area, unlike the other known devices which wet one area continuously and usually result in wet bedding. With the disclosed system, as a fan oscillates over a range of positions, by the time the fan returns to a starting position, water particles previously emitted have partially or totally evaporated. Temperature and humidity may be monitored so that the maximum amount of water for evaporative cooling can be supplied to each fan under real time environmental conditions. The upper constraint on the amount of water delivered by each fan will usually be a volume of water which would wet the animal's bedding. Other environmental conditions may also be monitored, such as wind velocity, the intensity of sunlight, or the position of the sun with respect to the location of the livestock and a shading structure.

The disclosed system can be configured to emit water at high pressure through small diameter nozzles, resulting in a small water particle fog, such that the water particles flash evaporate when they come into contact with any warm surface such as the skin of an animal or person. The result is a cool animal environment with little wetting of the animal's hair-coat and virtually no wetting of the animal's bedding.

Unlike prior disclosed systems in which the fans in a circuit are limited to synchronous oscillation, the present system allows either synchronous oscillation or it allows each fan within a circuit to be programmed so that each individual fan oscillates over different zones for any desired time period. The oscillation of each fan can be directed to a particular degree range according to different specified times of the day, according to observed environmental conditions, or according to specific locations where the animals are located. This ability to direct effective cooling according to the location of the animals and the real time environmental conditions increases animal comfort and health. Programming can be changed at any time to meet the individual preferences of the animal herds person.

Fan oscillation and water output can be varied according to a pre-programmed schedule or through real time monitoring of current environmental conditions. Current temperature, humidity and wind conditions may be monitored for different zones within a facility and the fan oscillation modified as required as disclosed herein. The water output may be controlled as required by a variable-frequency-drive on a high-pressure water pump. Water output may also be controlled by switching nozzle sizes and/or increasing the number of nozzles instead of or in addition to changing pump pressure output. In conjunction with programmable oscillation, programmable water output allows the herds person to fine tune the animal's environment for maximum economic gain and animal comfort.

SUMMARY OF THE INVENTION

The present invention is directed to a livestock cooling system which creates an environment which protects the health and productivity of the animals. The livestock cooling system may be installed to a structure having at least one fan support member. A fan, which creates an air stream, is rotatably coupled to the fan support member. An oscillation motor is operably connected to the fan for rotating the fan through a plurality of rotational positions, wherein the rotation of the fan between any two rotational positions describes an arc length. A position indication device senses either the rotational position of the fan or the rotational position of a rotatable shaft connected to the fan. The position indication device provides an output signal in response to the rotational position of the fan or the rotatable shaft. The output signal is provided to a control means which is electrically connected to the oscillation motor. Monitoring means which are connected to the control means, provide real time advice to the control means of the a desired arc length through which the fan and/or rotatable shaft should be traversing. Upon receiving the advice from the monitoring means, the control means causes the oscillation motor to oscillate the fan through the arc length which has been specified by the monitoring means. The fan may be further equipped with means for injecting water droplets into the air stream of the fan to create a fog or mist which further enhances the cooling effect of the cooling system.

A plurality of fans, each having its own oscillation motor, position indication device, and control means, may all be connected to the same monitoring means, thereby allowing each fan to oscillate through a different arc length as required for the particular facility. As with the individual fans, each fan in the multiple-fan system may be equipped with means for injecting water droplets into the air stream of each fan, where a pump is used to deliver water to each fan. The flow rate of water droplets may be adjusted by adjustment means, such as a variable frequency drive connected to the pump.

These and other features, aspects, and advantages of the present invention will become better understood with regard to the following description, appended claims, and accompanying drawings.

DETAILED DESCRIPTION OF THE EMBODIMENTS

Figure 1:
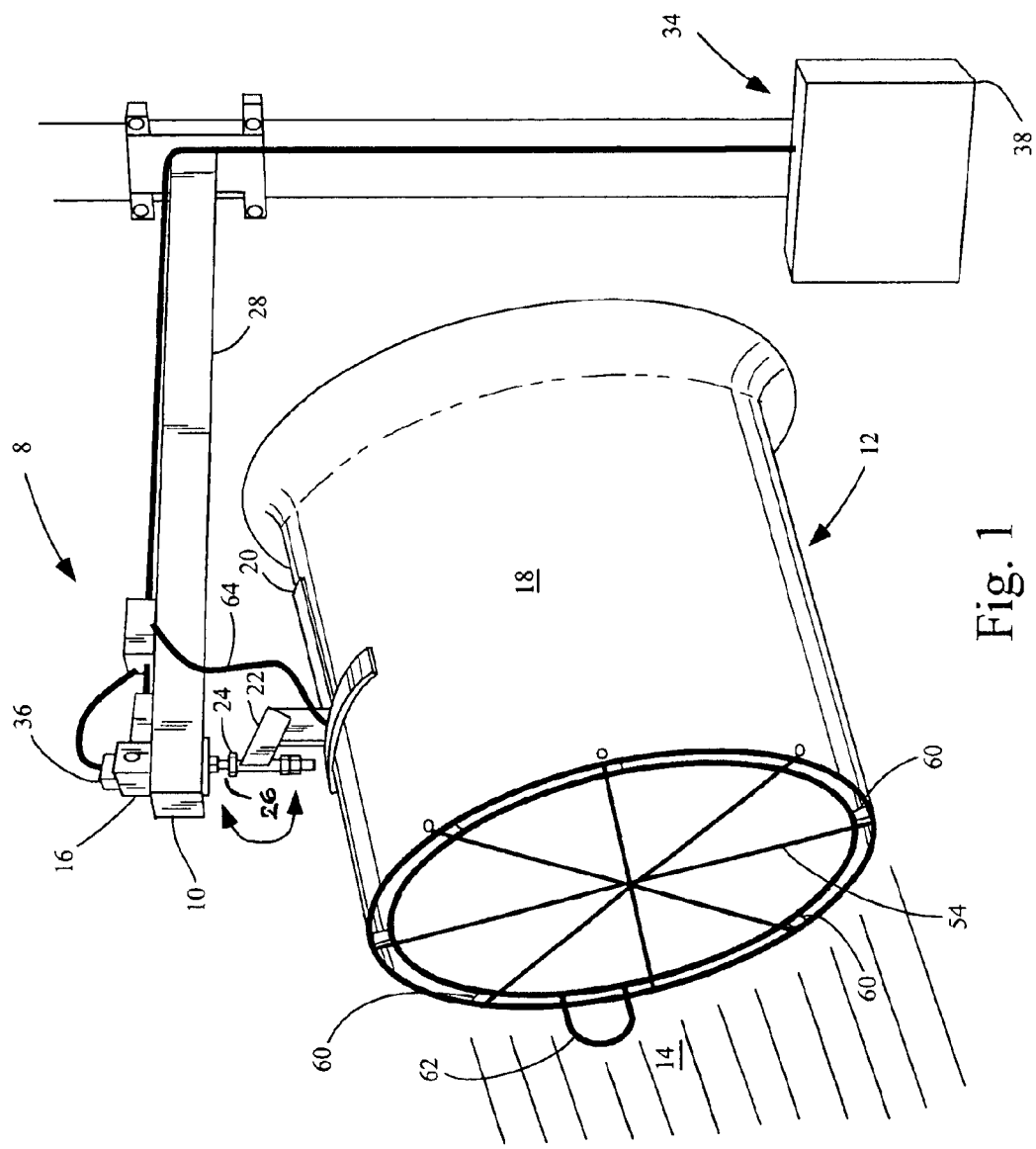
FIG. 1 is a perspective view of a fan station for one embodiment of the disclosed livestock cooling system.

It is to be understood that for purposes of the present disclosure, the term "livestock" used herein includes horses, cattle, swine and poultry. Referring now specifically to the drawings, FIG. 1 shows one embodiment of a fan station 8 for the disclosed livestock cooling system. This embodiment of a fan station 8 comprises a fan support member 10, to which a fan 12 is rotatably coupled. The fan 12 creates an air stream 14. An oscillation motor 16 is operably connected to fan 12.

Figure 2:
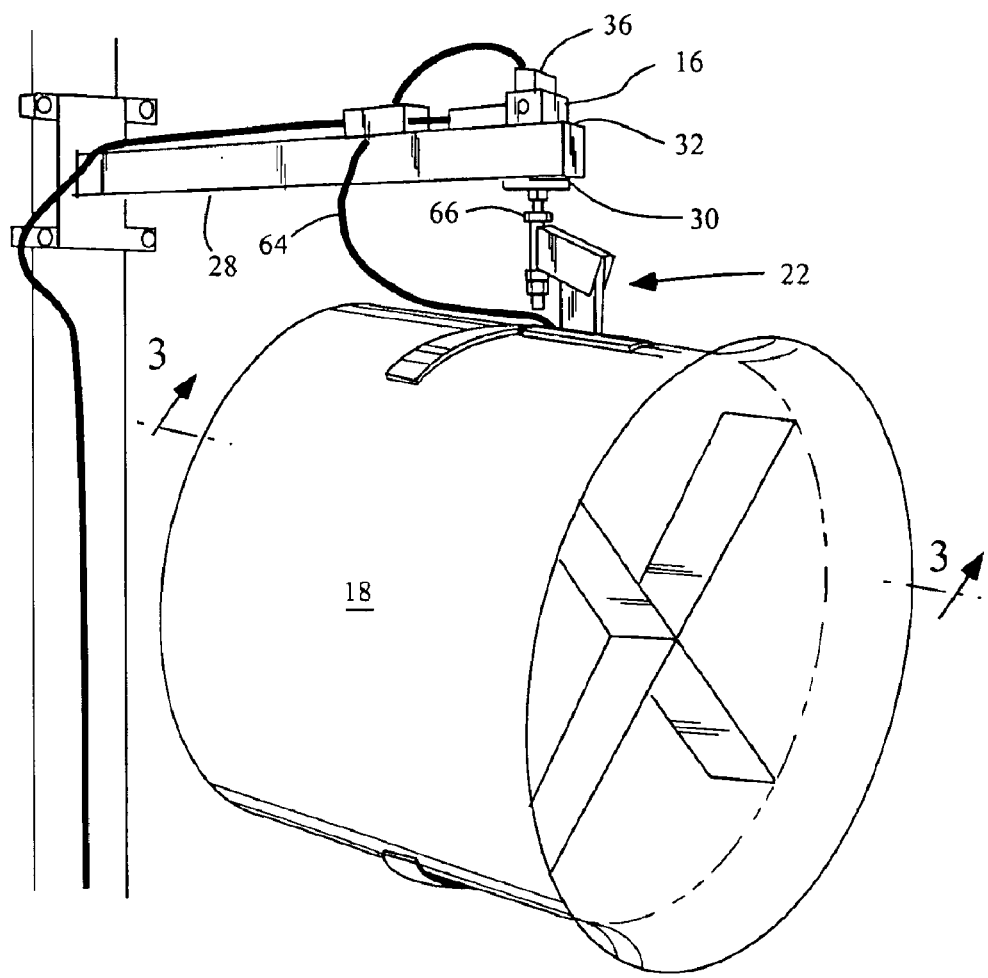
FIG. 2 is a second perspective view of a fan station for the embodiment of FIG. 1.

FIG. 1 shows one means of coupling the oscillation motor 16 to the fan 12. In this embodiment, the fan 12 has a fan housing 18. While any number of materials may be used for the fan housing 18, it is to be appreciated that light-weight materials such as plastics, composites or thin-walled sheet metal are desirable to minimize the weight. An attachment bracket 20 is attached to the fan housing 18. Connected to the attachment bracket is a yoke assembly 22 which comprises a shaft sleeve 24. Shaft sleeve 24 is attached to rotatable shaft 26 with locking means such that shaft sleeve 24 and the fan components attached thereto rotate as rotatable shaft 26 rotates. Rotatable shaft 26 is operably connected to oscillation motor 16. As shown in FIG. 1 and FIG. 2, rotatable shaft 26 may penetrate through the bottom side 28 of fan support member 10, passing through bearing 30, which may be a journal or roller type bearing. Rotatable shaft 26 extends through the top side 32 of the fan support member 10, where it is engaged by oscillation motor 16, which may be attached to the top side 32 of the fan support member 10. Oscillation motor 16 may be a SUMITOMO HYPONIC sub-fractional gearmotor of the hollow shaft type, or equivalent, which has a right angle hollow shaft for engaging rotatable shaft 26.

Oscillation motor 16 is started and stopped by control means 34. As shown schematically in FIG. 4, control means 34 comprises a control box 38 containing a central processing unit 40 ("CPU"), a power supply 42, and current control means 44 for starting, stopping, and reversing oscillation motor 16, such as relays and/or silicon-controlled rectifiers ("SCRs") or thyristors. Such devices allow the oscillation motor 16 to start rotating the rotatable shaft 26 from a first rotational position and to stop rotating the rotatable shaft at a second rotational position, where the rotation of the rotatable shaft from the first rotational position to the second rotational position describes an arc length. Upon the rotatable shaft 26 rotating to the second rotational position, control means 34 stops the oscillation motor 16. Electrical current to the oscillation motor is reversed by the current control means 44 of the control means 34, causing the oscillation motor 16 to rotate in the opposite direction, returning the rotatable shaft 26 back to the first rotational position, where the control means 34 once again stops oscillation motor 16, and another cycle of oscillation is begun. Control means 34 may be further equipped with soft-start and soft-deceleration components to prevent damage to oscillation motor 16 and other system components during the oscillation cycle.

Control means 34 receives a signal produced by position indication device 36, which senses the rotational position of the rotatable shaft 26 and provides an output signal in response to the observed rotational position of the rotatable shaft to the CPU 40 of the control means 34. Because the rotatable shaft 26 is directly coupled to the fan 12, the position indication device 36 provides the rotational position of the fan 12 itself to the control means 34. Suitable position indication devices 34 include rotary displacement sensors, such as the RVIT-Z series manufactured by SCHAEVITZ. Alternatively, an optical encoder may be used as the position indication device 36. Suitable encoders are manufactured by DYNAPAR.

Figure 6:
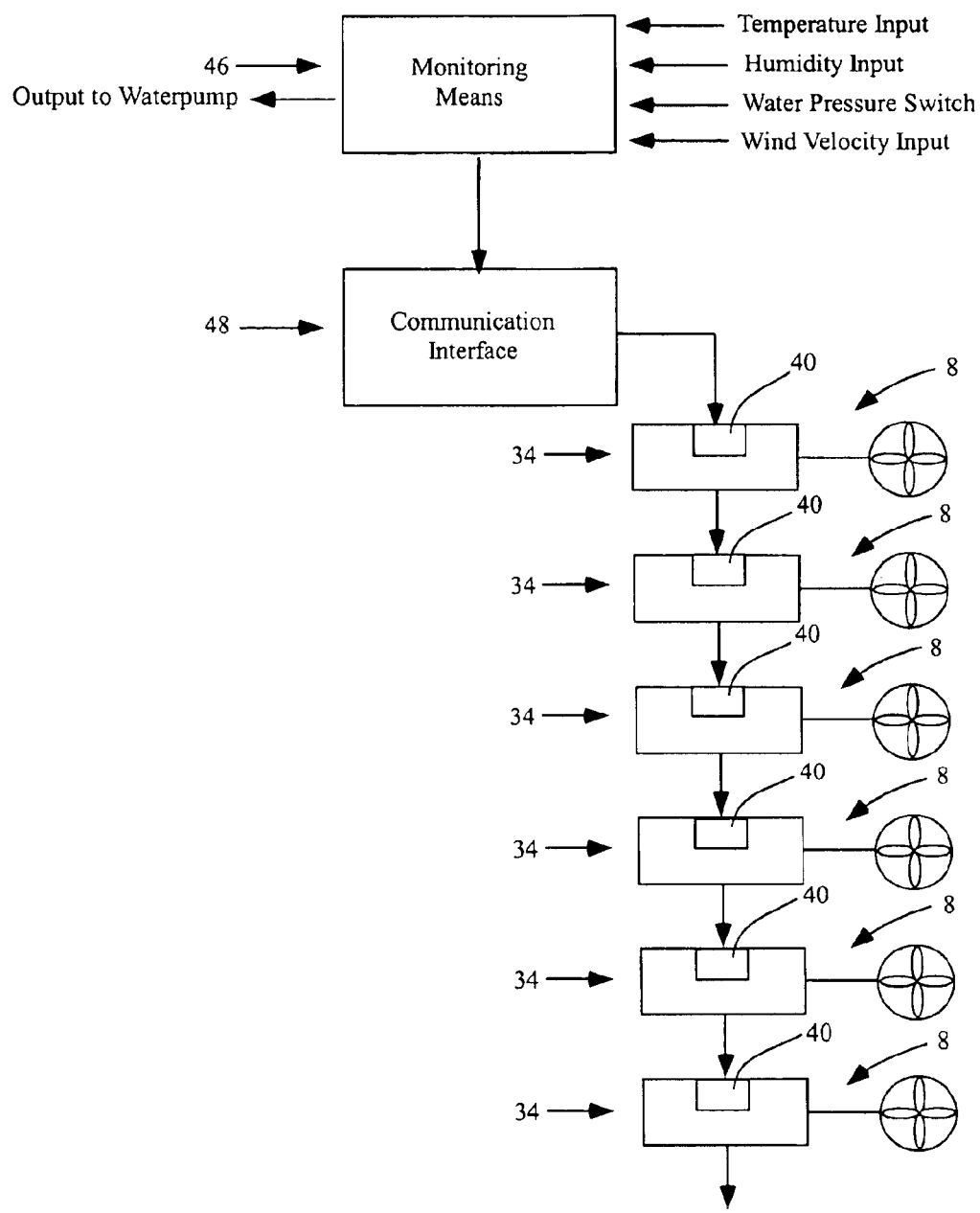
FIG. 6 shows a plurality of fan stations may be connected to a single processor.

As shown schematically in FIG. 6, the CPU 40 of each control means 34 in a circuit of fan stations 8 receives real time values from monitoring means 46 regarding the desired arc length for each fan, which is defined by two rotational positions of the rotatable shaft 26 for a given fan station 8. Monitoring means 46 may be a programmable logic controller ("PLC"). Because of its programmability, the monitoring means 46 may vary the desired arc length (i.e., a starting rotational position and a stopping rotational position) for a particular fan 12 in the system according to any number of input values, including time of day, temperature as inputted from a temperature sensing device, humidity as inputted from a humidity sensing device, wind speed and direction as inputted from a wind sensing device, or light intensity as inputted from a lumen measuring device or ultra violet light meter. It is to be appreciated that different zones within a facility might have different environmental conditions for a particular time of day. Environmental sensors detecting each of the above conditions (i.e., temperature, humidity, wind velocity, etc.) may be located within each different zone, with input values reported to the monitoring means 46. The present invention allows the herds person to control the fan stations 8, including water volume and pressure, within each zone to achieve the optimal oscillation and water injection for that zone Monitoring means 46 will typically communicate with the CPU 40 of the control means 34 via serial communication interfaces 48, such as RS-232 or, more typically because of the distance between the PLC and the CPU and the benefit of connecting multiple CPUs to a single PLC, a RS-422/485 interface, which may be used in conjunction with a RS-232 to RS-422/485 or other appropriate converter. The RS-422/RS485 protocol typically allows the monitoring means 46 to send and receive data from the CPUs 40 of thirty-two different fan stations 8 from distances of several thousand feet, although both the number of stations may be expanded by adding an additional interface, or by new technology. It is to be appreciated that other communication protocols might also be used between the monitoring means 46 and the control means 34, such as 0–90 VDC or radio communications.

The CPU 40 contained within control means 34, compares the start and stop values received from the monitoring means 38 to the values reported to the CPU from the position indication device 36. The CPU provides output to the oscillation motor 16 via the current control means 44, which may be silicon-controlled rectifiers or relays, so that the oscillation motor starts at the desired rotational position and rotates the rotatable shaft 26 (and the attached fan 12) to the desired stop point, at which point current to the motor is reversed through the current control means 44, causing the oscillation motor 16 to reverse direction, rotating rotatable shaft 26 (and the attached fan 12) back to the original starting point. This cycle is continued until the monitoring means 46 provides new start and stop values to the control means 34, or the monitoring means advises the control means that oscillation should stop.

Figure 3:
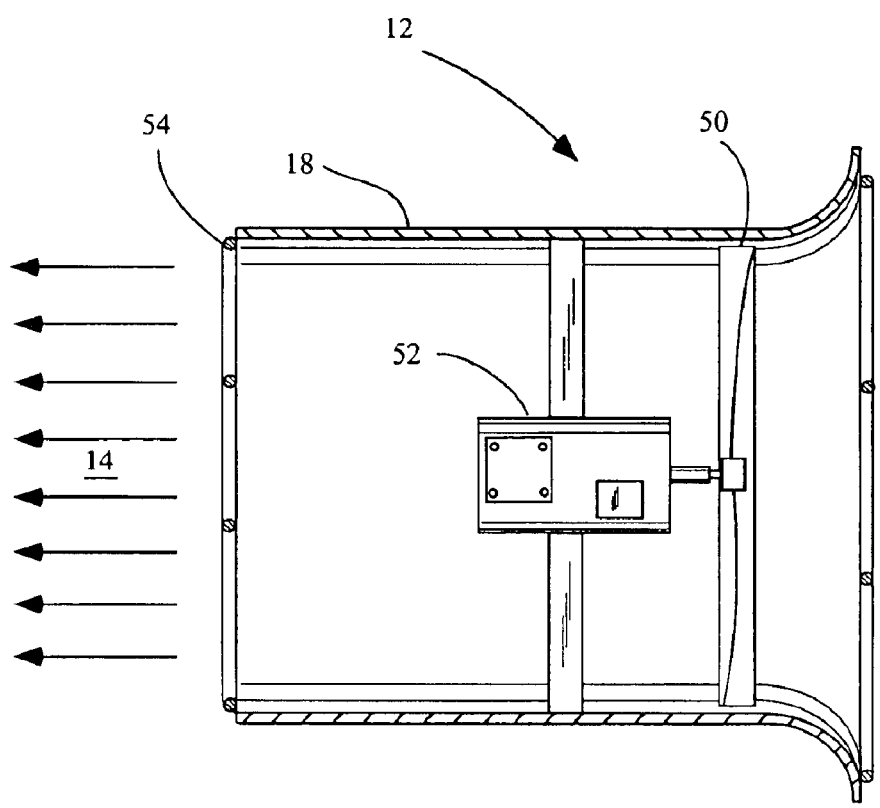
FIG. 3 is a cross-sectional view of the fan of FIG. 2 taken along line 3—3.

As shown in FIG. 1 and FIG. 3, each fan 12 comprises a blade 50 enclosed within fan housing 18, a motor 52 attached within the fan housing for rotating the blade, and a grill 54 may be attached to the front of the housing. As shown in FIG. 1, a mist ring 56 may be attached to the grill 54, and nozzles 60 attached to the mist ring. A high pressure water line 62 is connected to the mist ring 56 for providing high pressure water to the nozzles 60. Power cable 64 provides electrical power to the motor 52. Fan 12 creates an air stream 14 into which water droplets may be injected from the nozzles 60 mounted within the mist ring 56. Stainless steel or other corrosion resistant materials with acceptable pressures ratings are acceptable materials for construction of the mist ring 56. Nozzles 60 may be screwed into female connections welded to mist ring 56 or otherwise attached. Water is delivered into high pressure water line 62 by a pump which is controlled by monitoring means 46. The pump flow rate, and thus outlet pressure, may be controlled by various pressure control means, such as a variable frequency drive located in either a local panel or within monitoring means 46.

Motor 52 may be disposed at the approximate center of the fan housing 18 to achieve optimal balance. Because motor 52 is disposed within air stream 14 (i.e., the blade 50 of the fan 12 is located behind the motor), the motor is cooled by the fan blade 50

When water droplets are injected into the air stream 14 of each fan 12, there is the possibility of creating a drench, a mist, or a fog, depending upon, among other factors, including environmental conditions, the volume of injected water, the injection pressure, and the droplet size. A drench showers the animal, wetting the animal to its skin, but is not normally a suitable cooling method when the animal is in its bedding area or is being milked. With a mist, the water droplets injected into the air stream 14 are smaller than with a drench, but the air becomes saturated with continued water injection, resulting in the animals and bedding becoming wet. A mist creates an undesirable water layer on the animal which acts as an insulator and retains heat.

With fog, water is emitted through very small diameter nozzles 60 at a sufficiently high pressure so as to result in extremely small water particles. These water particles will flash evaporate when the particles come into contact with any warm surface such as the skin of an animal or person, resulting in a cool animal environment with little wetting of the animal's hair-coat and virtually no wetting of the animal's bedding.

Figure 4:
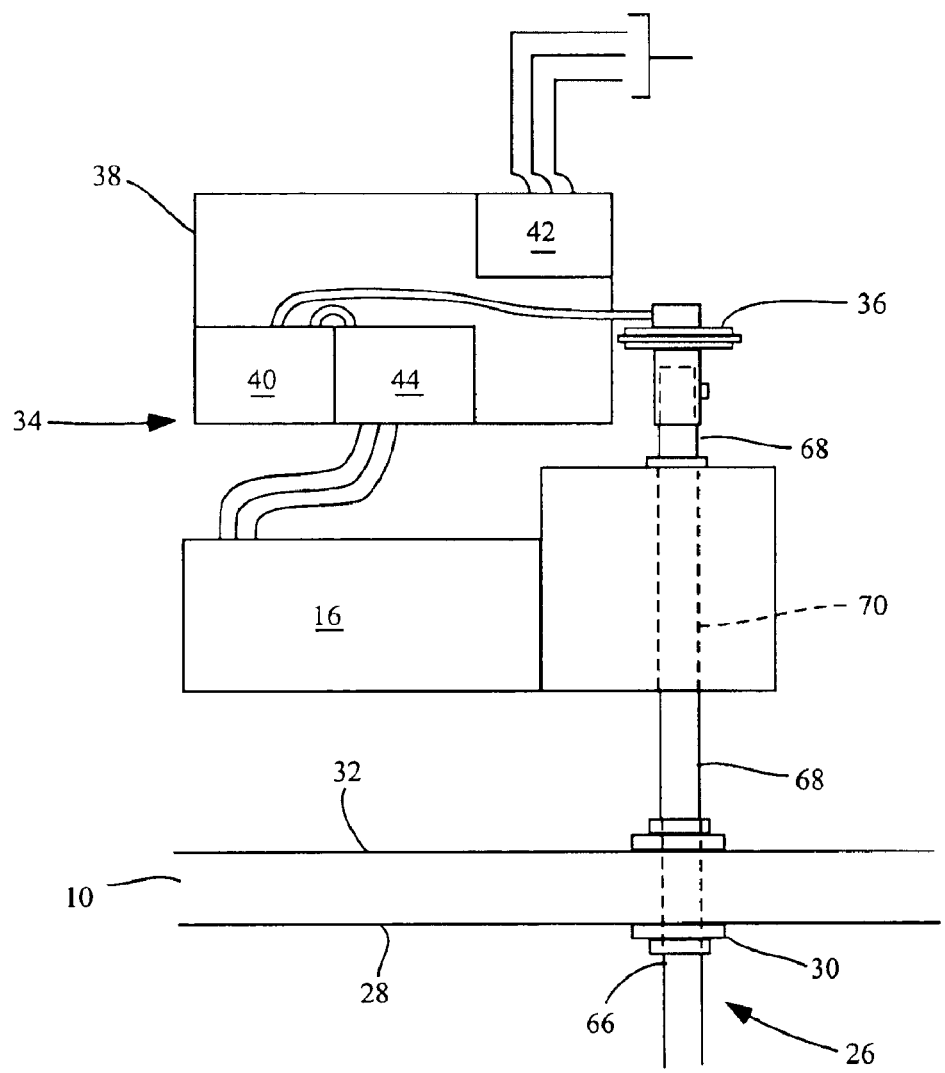
FIG. 4 shows a first configuration for coupling the oscillation motor to the fan.
Figure 5:
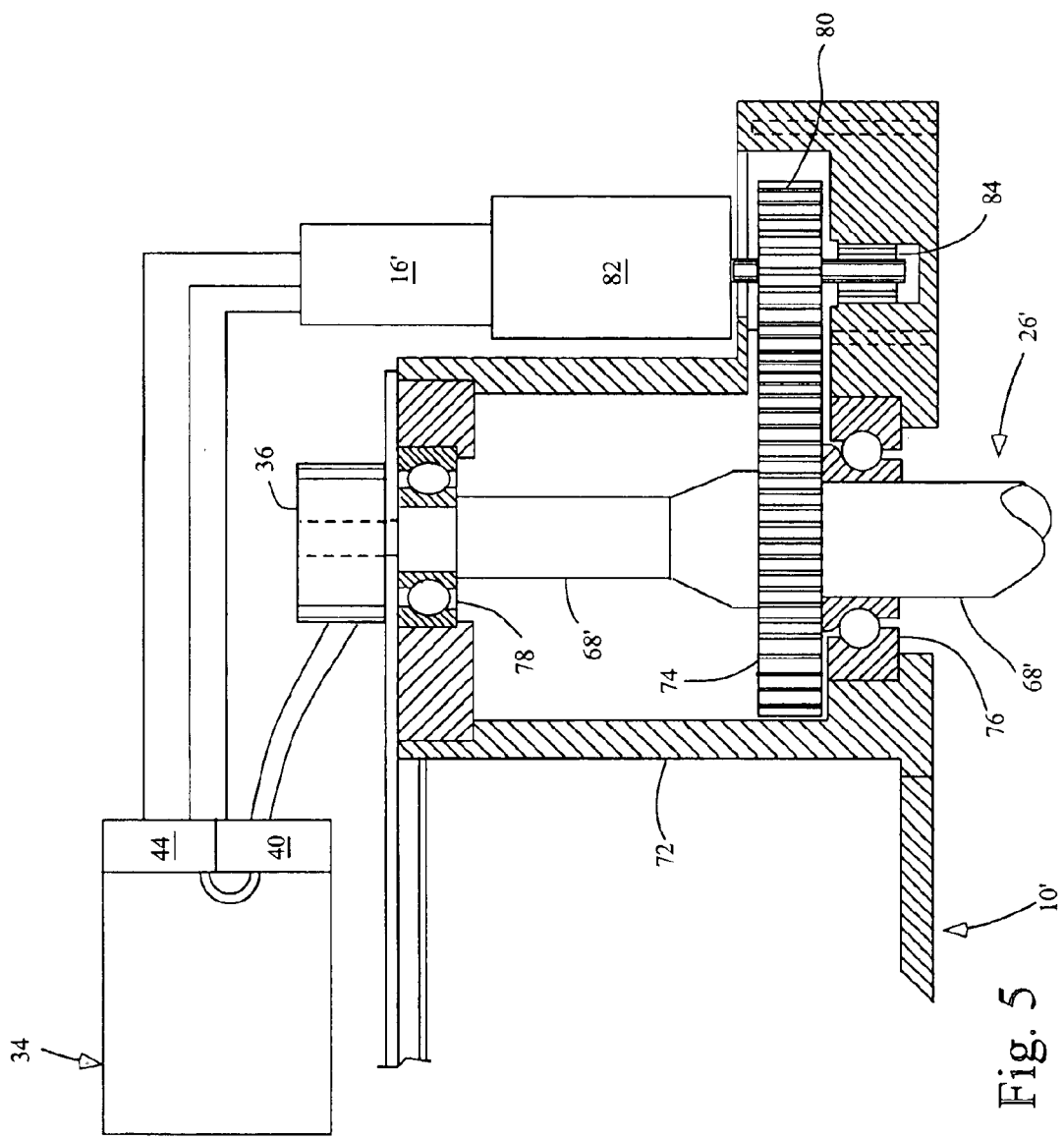
FIG. 5 shows a second configuration for coupling the oscillation motor to the fan.

FIG. 4 and FIG. 5 show different configurations of connecting an oscillation motor to a rotatable shaft. FIG. 4 generally depicts a first configuration where the oscillation motor 16 is connected to a rotatable shaft 26 as described above. Rotatable shaft 26 has a first end 66 which extends below the bottom side 28 of fan support member 10. Rotatable shaft 26 may have a second end 68 which passes through the top side 32 of fan support member 10 and second end 68, or an extension thereof, is engaged by the hollow shaft 70 of the oscillation motor 16. Second end 68, or an extension thereof, extends through the hollow shaft 70, and is connected to position indication device 36. It is to be appreciated that while FIG. 4 schematically shows control means 34 to be located above oscillation motor 16, control means 34 may be remotely located in control box 38 a short distance away from the oscillation motor 16 and the position indication device 36.

FIG. 5 shows a second configuration for connecting an oscillation motor 16' to a rotatable shaft 26'. In this embodiment, first end 66 of the rotatable shaft (not shown in FIG. 5) is the same as described above. However, fan support member 10' has been modified for attachment of gear housing 72. First gear 74 is disposed on second end 68' of rotatable shaft 26'. Second end 68' is provided lateral and vertical support by bottom bearing 76, which must be capable of supporting the weight of fan 12, including dynamic loading induced by oscillation of the fan. Second end 68', or an extension thereof, extends through top bearing 78, and connected to position indication device 36. A drive gear 80 is disposed adjacent to first gear 74 and engages the first gear. Drive gear 80 is connected to gearbox 82. First gear 74 and drive gear 80 may be enclosed within gear housing 72. Oscillation motor 16' may be coupled to gearbox 82. Drive gear 80 is supported by needle bearing 84. An acceptable oscillation motor 16' is manufactured by LINIX MOTOR COMPANY.

Whether the first configuration or second configuration is utilized, it has been found desirable to maintain a relatively slow oscillation speed, such as 2 to 6 RPM. The slower oscillation provides efficient cooling of livestock and also reduces equipment wear and maintenance which may be required for faster oscillation speeds. The specific components of the system, including the gear ratios of the oscillation motor 16 and gear box 82, may be specified by those skilled in the art to achieve the desired oscillation speed.

While the above is a description of various embodiments of the present invention, further modifications may be employed without departing from the spirit and scope of the present invention. For example, the size, shape, position and/or material of the various components may be changed as desired. Thus the scope of the invention should not be limited by the specific structures disclosed. Instead the true scope of the invention should be determined by the following claims.

What is claimed is:

1. A livestock cooling system comprising:
   (a) a fan support member;
   (b) a fan rotatably coupled to the fan support member, the fan creating an air stream;
   (c) an oscillation motor operably connected to the fan for rotating the fan through a plurality of rotational positions, wherein the rotation of the fan between any two rotational positions describes an arc length;
   (d) a position indication device which senses the rotational position of the fan and provides an output signal in response to the rotational position of the fan, the output signal provided to a control means, the control means electrically connected to the oscillation motor;
   (e) monitoring means connected to the control means, said monitoring means providing real time advice to the control means of a desired arc length; and
   (f) the control means adapted to cause the oscillation motor to oscillate the fan through the desired arc length.

2. The livestock cooling system of claim 1 further comprising means for injecting water droplets into the air stream of the fan.

3. The livestock cooling system of claim 2 wherein the means for injecting water droplets into the air stream of the fan comprises a mist ring attached to the fan and water is delivered to the mist ring through a high pressure water line.

4. A livestock cooling system comprising:
   (a) a fan support member;
   (b) a fan rotatably coupled to the fan support member, the fan creating an air stream, the fan enclosed within a fan housing;

(c) an attachment bracket attached to the fan housing;

(d) a rotatable shaft, having a first end and a second end, the first end connected to the attachment bracket with fastening means;

(e) the second end of the rotatable shaft operably connected to an oscillation motor for rotating the rotatable shaft through a plurality of rotational positions, wherein the rotation of the rotatable shaft between any two rotational positions describes an arc length;

(d) a position indication device which senses the rotational position of the rotatable shaft and provides an output signal in response to the rotational position of the rotatable shaft, the output signal provided to a control means, the control means electrically connected to the oscillation motor;

(e) monitoring means connected to the control means, said monitoring means providing real time advice to the control means of a desired arc length; and (f) the control means adapted to cause the oscillation motor to oscillate the rotatable shaft through the desired arc length.

5. The livestock cooling system of claim 4 wherein the fan support member has a top side and a bottom side and the oscillation motor is attached to the top side and the rotatable shaft penetrates through the fan support member and is coupled to the oscillation motor.

6. The livestock cooling system of claim 4 further comprising means for injecting water droplets into the air stream of the fan.

7. The livestock cooling system of claim 6 wherein the means for injecting water droplets into the air stream of the fan comprises a mist ring attached to the fan and water is delivered to the mist ring through a high pressure water line.

8. A livestock cooling system comprising:

(a) a fan support member;

(b) a fan rotatably coupled to the fan support member, the fan creating an air stream, the fan enclosed within a fan housing;

(c) an attachment bracket attached to the fan housing;

(d) a rotatable shaft, having a first end and a second end, the first end connected to the attachment bracket with fastening means and the second end having a first gear disposed thereon;

(e) a drive gear disposed adjacent to and engaging the first gear of the rotatable shaft;

(f) an oscillation motor operably coupled to the drive gear, wherein the oscillation motor causes the drive gear to rotate the first gear and the rotatable shaft through a plurality of rotational positions, wherein the rotation of the rotatable shaft between any two rotational positions describes an arc length;

(g) a position indication device which senses the rotational position of the rotatable shaft and provides an output signal in response to the rotational position of the rotatable shaft, the output signal provided to a control means, the control means electrically connected to the oscillation motor;

(h) monitoring means connected to the control means, said monitoring means providing real time advice to the control means of a desired arc length; and (i) the control means adapted to cause the oscillation motor to rotate the drive gear thereby oscillating the rotatable shaft and fan through the desired arc length.

9. The livestock cooling system of claim 8 wherein the fan support member has a top side and a bottom side and the oscillation motor is attached to the top side and the rotatable shaft penetrates the fan support member.

10. The livestock cooling system of claim 8 further comprising means for injecting water droplets into the air stream of the fan.

11. The livestock cooling system of claim 10 wherein the means for injecting water droplets into the air stream of the fan comprises a mist ring attached to the fan and water is delivered to the mist ring through a high pressure water line.

12. A livestock cooling system comprising:

(a) a fan support member;

(b) a fan rotatably coupled to the fan support member, the fan creating an air stream, the fan enclosed within a fan housing;

(c) an attachment bracket attached to the fan housing;

(d) a rotatable shaft, having a first end and a second end, the first end connected to the attachment bracket with fastening means and the second end having a first gear disposed thereon;

(e) a drive gear disposed adjacent to and engaging the first gear of the rotatable shaft;

(f) a gear box coupled to the drive gear;

(g) an oscillation motor operably coupled to the gear box, wherein the oscillation motor causes the drive gear to rotate the first gear and the rotatable shaft through a plurality of rotational positions, wherein the rotation of the rotatable shaft between any two rotational positions describes an arc length;

(h) a position indication device which senses the rotational position of the rotatable shaft and provides an output signal in response to the rotational position of the rotatable shaft, the output signal provided to a control means, the control means electrically connected to the oscillation motor;

(i) monitoring means connected to the control means, said monitoring means providing real time advice to the control means of a desired arc length; and (j) the control means adapted to cause the oscillation motor to rotate the drive gear thereby oscillating the rotatable shaft and fan through the desired arc length.

13. The livestock cooling system of claim 12 wherein the first gear and the drive gear are enclosed within a gear housing.

14. The livestock cooling system of clam 12 wherein the second end of the rotatable shaft is supported by a bearing.

15. The livestock cooling system of claim 12 wherein the drive gear is supported by a bearing.

16. The livestock cooling system of claim 12 further comprising means for injecting water droplets into the air stream of the fan.

17. The livestock cooling system of claim 16 wherein the means for injecting water droplets into the air stream of the fan comprises a mist ring attached to the fan and water is delivered to the mist ring through a high pressure water line.

18. A livestock cooling system comprising:

(a) a plurality of fan support members;

(b) a plurality of fans, each fan creating an air stream and each fan rotatably coupled to a fan support member;

(c) an first oscillation motor operably connected to a first fan for rotating the first fan through a plurality of rotational positions, wherein the rotation of the first fan between any two rotational positions describes an arc length;

(d) an second oscillation motor operably connected to a second fan for rotating the second fan through a plurality of rotational positions, wherein the rotation of the second fan between any two rotational positions describes an arc length;

(e) a first position indication device which senses the rotational position of the first fan and provides an output signal in response to the rotational position of the first fan, the output signal provided to a first control means, the first control means electrically connected to the first oscillation motor;

(f) a second position indication device which senses the rotational position of the second fan and provides an output signal in response to the rotational position of the second fan, the output signal provided to a second control means, the second control means electrically connected to the second oscillation motor;

(g) monitoring means connected to the first control means and to the second control means, said monitoring means providing real time advice to the first control means of a first desired arc length for the first fan and said monitoring means providing real time advice to the second control means of a second desired arc length for the second fan; and (f) the first control means adapted to cause the first oscillation motor to oscillate the first fan through the first desired arc length and the second control means adapted to cause the second oscillation motor to oscillate the second fan through the second desired arc length.

19. The livestock cooling system of claim 18 further comprising means for injecting water droplets into the air stream of the first fan and into the air stream of the second fan.

20. The livestock cooling system of claim 19 wherein the means for injecting water droplets into the air stream of the first fan comprises a first mist ring attached to the first fan and water is delivered to the first mist ring through a high pressure water line.

\* \* \* \* \*